Jan. 5, 1954  B. F. SCHMIDT  2,665,149
HYDRAULIC DRILLING LIFT AND PACKER THEREFOR
Filed March 24, 1949

INVENTOR.
BENJAMIN F. SCHMIDT
BY
Mellin and Hanscom
ATTORNEYS

Patented Jan. 5, 1954

2,665,149

UNITED STATES PATENT OFFICE 2,665,149

HYDRAULIC DRILLING LIFT AND PACKER THEREFOR

Benjamin F. Schmidt, Los Angeles, Calif.

Application March 24, 1949, Serial No. 83,270

3 Claims. (Cl. 286—26)

This invention relates to and in general has for its object the provision of packing means for effecting a running seal between a cylinder or casing and a piston or plunger arranged to reciprocate therein.

Ordinarily the cylinders of hydraulic lifts are free of joints throughout their length and consequently no particular difficulty is experienced in making and maintaining a fluid tight seal between it and its associated plunger. Where, however, it is desired that the stroke of a lift be extremely long, as in the case of the lift disclosed in the Mason Patent 2,240,794 of May 6, 1941, its cylinder or casing must be made up of joined sections. In such cases conventional methods of sealing the plunger to its casing fail primarily because of the joints between the pipe sections.

More specifically then the object of this invention is the provision of packing means for effecting a running hydraulic seal between a jointed casing and its plunger.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Figure 1:
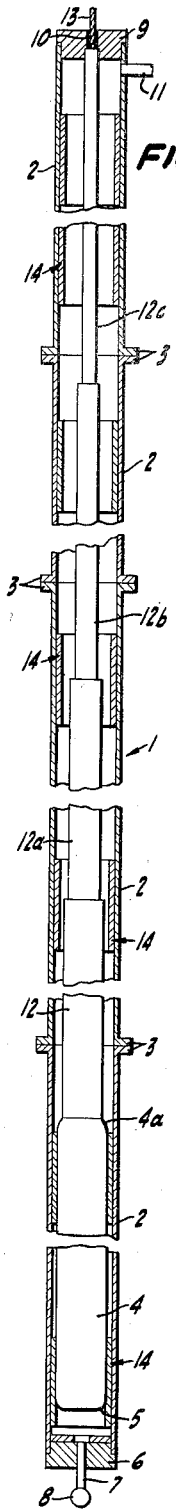
Fig. 1 is a schematic, vertical cross-sectional view of a casing and plunger embodying the objects of my invention.

The hydraulic lift illustrated in Fig. 1 comprises a cylinder or casing generally designated by the reference numeral 1 and made up of joined sections 2. Each end of each of the casing sections 2 is provided with a flange 3 by which they are bolted together to form an integral casing of extended length. Disposed within the casing 1 is a cylindrical plunger 4 of an outer diameter somewhat smaller than the internal diameter of the casing. Preferably the upper and lower end of the plunger are rounded as at 4a and 5 so as to enable it to enter and pass through the packers associated with the casing 1. Sealed over the lower end of the casing 1 is a lower casing head 6 and extending therethrough in communication with the interior of the casing is an outlet pipe 7 provided with a valve 8. Sealed to the upper end of the casing 1 is an upper casing head 9 provided with a central opening 10. Communicating with the upper end of the casing is a valved controlled inlet pipe 11.

Fastened to the upper end of the plunger 4 coaxially therewith, is a tube 12 arranged to telescopically receive a tube 12a. The tube 12a is in turn arranged to telescopically receive a tube 12b which in turn telescopically receives a tube 12c. The upper end of the tube 12c is fastened and sealed to the upper casing head 9 and the tubes 12, 12a, 12b and 12c are designed to have a liquid tight running fit with each other. Extending through the hole 10 of the upper casing head 9 and through the tubes 12c, 12b, 12a and 12 is a cable 13, fastened at its lower end to the upper end of the plunger 4. The telescopic tubes therefore serve to prevent the passage of fluid around the cable 13 and into the casing 2.

Fastened to and within each casing section 2 are a number of longitudinally spaced rubber-covered packers generally designated by the reference numeral 14 and of an inner diameter and of a construction which will serve to effect a running seal with the plunger 4. As shown in Fig. 1, the longitudinal spacing of the packers 14 should be so correlated with respect to the length of the plunger 4 that at least two packers are always in sealing engagement with the plunger even when the plunger lies adjacent one of the casing joints.

Figure 2:
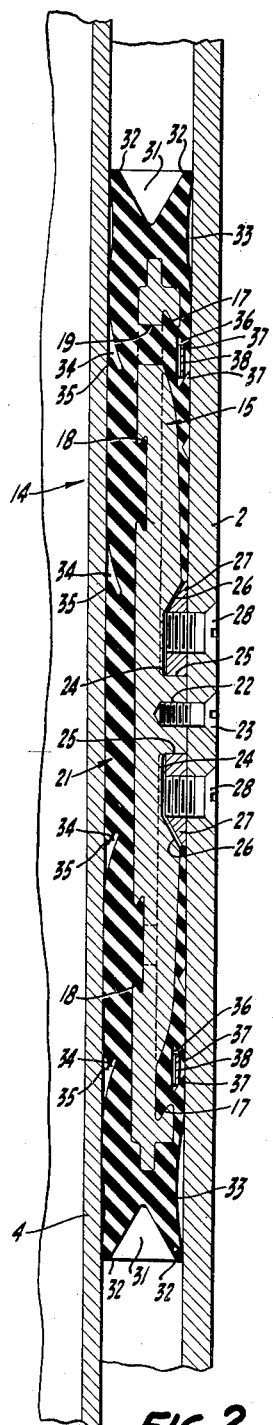
Fig. 2 is a fragmentary, longitudinal mid-section taken through a casing and plunger sealed with a packer embodying the objects of my invention.
Figure 3:
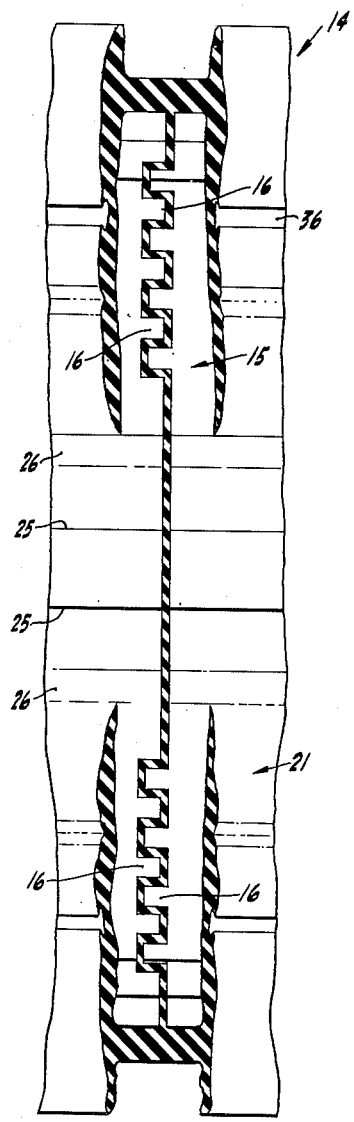
Fig. 3 is an elevation of the packer shown in Fig. 2 with a portion of its rubber covering broken away better to illustrate its sectionalized construction.

As shown in Figs. 2 and 3, each of the packers 14 includes a metal cylindrical core generally designated by the reference numeral 15 and split longitudinally into three equal sections each subtending an angle of substantially 120°. As shown in Fig. 3, the longitudinal edges of each of the three core sections are crenelated as at 16, the crenellations on one edge of one section being offset relative to the crenellations of the adjacent edge of the adjacent sections, so that the adjacent crenellations can be interdigitated. By resorting to a longitudinally split core of this fashion the resulting cylindrical structure is capable of radial expansion and contraction.

Formed on the outer surface of each end of the core 15 is an undercut channel 17 and similarly formed on its inner surface and intermediate its ends are undercut channels 18. Extending through the core at spaced points throughout its area are holes 19. Entirely surrounding and bonded to the longitudinally sectionalized core 15 is a resilient rubber covering 21 which with the core forms an integral generally cylindrical packer arranged to be fastened and sealed to the casing sections and arranged to have a fluid tight running seal with the outer surface of the plunger 4. The undercut channels 17 and 18 and the holes 19 are of course filled with rubber when the rubber covering 21 is molded to the packer core 15 and serve to effect a better bond between these elements.

To fasten the packers 14 to the casing 2 they are provided with peripherally spaced, threaded bores 22 arranged to receive screws 23 extending inwardly thereinto through the casing. In addition to this, channels 24 are molded into the outer surface of the rubber covering 21, these channels being defined on one side by straight shoulders 25 and on their opposite sides with the inclined shoulders 26. Accommodated within each of the channels 24 is a ring 27 having a cylindrical outer surface and an inner surface conforming to the contour of the channel. Extending through the casing 2 at peripherally spaced points are screws 28 having threaded engagement with the ring 27. The rings 27 therefore serve to hold the packers against longitudinal movement relative to the casing 2.

To ensure a perfect fluid tight seal between each packer and its casing section and between each packer and the plunger 4, the outer ends of the rubber covering 21 are provided with a V-shaped channel 31 defined by resilient wedge-shaped lips 32. To further increase the resiliency of the lips 32, the side walls of the rubber covering 21 adjacent the lips 32 are inwardly dished as at 33. Formed on the inner surface of the rubber covering 21 are a number of undercut grooves 34 defining flexible lips 35 arranged to be forced inwardly against the surface of the plunger 4 by any fluid which may pass between the rubber covering 21 and the plunger 4 into the channel 34. It should be here noted that as shown in Fig. 2 there are two such circular lips 35 directed to the lower end of the packer and two similar lips 35 directed to the upper end of the packer. Formed on the outer surface of the rubber covering 21 is an undercut channel 36 defined by opposed wedge-shaped lips 37 and accommodated within this channel is a spring band 38 serving to hold the two wedge-shaped lips 37 outwardly in fluid sealing engagement with the inner walls of the casing 2.

Due to the resiliency of the rubber covering 21 and due to the fact that the core 15 is split longitudinally into three sections and is radially contractible, the packers 14 can be readily inserted into the casing 2 and brought into proper longitudinal alignment with the screws 23 and 28. Upon screwing home these screws the outer surface of the rubber covering 21 of each packer is brought into fluid tight sealing engagement with the inner surface of the casing 2. The existence of fluid pressure on the lower end of the packer as viewed in Fig. 2 serves to force the wedge-shaped lips 32 into sealing engagement with the inner walls of the casing 2 and the outer walls of the plunger 4. If by chance any fluid passes between these lips and the plunger 4 such fluid will be received in the channels 34 and therefore serve to force the lips 35 into fluid tight sealing engagement with the plunger 4. The operation of the corresponding lips on the upper end of the packer is of course similar but in the reverse direction to that just described.

It will therefore be seen that a packer of this construction serves to form an effective seal between the associated casing and plunger irrespective of the direction of the fluid pressure to which the system is subjected. Since these packers are so positioned longitudinally of the casing 2 that the plunger 4 is always in sealing engagement with at least two of the packers even when passing over one of the casing joints, there is no necessity for finishing the interior surface of the casing 4 or of attempting to produce accurate joints between the casing sections.

I claim:

1. A packing including a unitary cylindrical sleeve of deformable material having an imbedded rigid core comprising longitudinally split sections and means for securing the core to a pump element, said means including a rigid ring loosely mounted within a groove of said core, and means securing said ring to said pump element.

2. A packing including a unitary cylindrical sleeve of deformable material having an embedded rigid core comprising longitudinally split sections and means for securing the core to a pump element, said means including a pair of spaced rigid rings loosely mounted in a pair of spaced grooves in said core, and means securing said ring to said pump element.

3. A packing including a unitary cylindrical sleeve of deformable material having an embedded rigid core comprising longitudinally split sections and means for securing the core to a pump element, said means including a pair of spaced rigid rings loosely mounted in a pair of spaced grooves in said core, means securing said ring to said pump element, and means directly engaging said pump element with said core.

BENJAMIN F. SCHMIDT.

References Cited in the file of this patent

UNITED STATES PATENTS

| Number | Name | Date |
|--------|------|------|
| 341,973 | Watson | May 18, 1886 |
| 447,261 | Shortt | Feb. 24, 1891 |
| 600,961 | Burnett | Mar. 22, 1898 |
| 619,784 | Perry | Feb. 21, 1899 |
| 786,697 | Wackenhuth | Apr. 4, 1905 |
| 1,456,166 | Wilcox | May 22, 1923 |
| 1,671,978 | Carroll | June 5, 1928 |
| 1,813,402 | Hewitt | July 7, 1931 |
| 1,918,442 | Baash et al. | July 18, 1933 |
| 2,079,949 | Novati | May 11, 1937 |
| 2,227,771 | Victor et al. | Jan. 7, 1941 |
| 2,244,135 | Wallace | June 3, 1941 |
| 2,259,432 | Failing et al. | Oct. 14, 1941 |
| 2,391,159 | Hermansen | Dec. 18, 1945 |
| 2,402,114 | Le Clair | June 11, 1946 |
| 2,417,828 | Joy | Mar. 25, 1947 |
| 2,430,836 | Taylor | Nov. 11, 1947 |
| 2,443,332 | Summers | June 15, 1948 |
| 2,464,653 | Phipps | Mar. 15, 1949 |

FOREIGN PATENTS

| Number | Country | Date |
|--------|---------|------|
| 556,346 | Great Britain | of 1943 |
| 700,403 | Germany | of 1940 |